United States Patent [19]

Marsh et al.

[11] Patent Number: 5,966,083
[45] Date of Patent: *Oct. 12, 1999

[54] ELECTRONIC INDENTIFICATION SYSTEM WITH TRANSPONDER MUTING

[75] Inventors: Michael John Camille Marsh; Andrzej Lenarcik, both of Johannesburg, South Africa

[73] Assignee: BTG International Limited, London, United Kingdom

[*] Notice: This patent is subject to a terminal disclaimer.

[21] Appl. No.: 08/976,948

[22] Filed: Nov. 24, 1997

Related U.S. Application Data

[63] Continuation of application No. 08/581,798, Jan. 2, 1996, abandoned, which is a continuation of application No. 07/816,893, Jan. 3, 1992, Pat. No. 5,537,105.

[30] Foreign Application Priority Data

Jan. 4, 1991 [ZA] South Africa ............................ 91-0078
Jul. 22, 1991 [ZA] South Africa ............................ 91-5733

[51] Int. Cl.⁶ ................................ H04Q 7/00; G07C 9/00
[52] U.S. Cl. ................................ 340/825.54; 340/825.34
[58] Field of Search ......................... 340/825.54, 825.52, 340/825.5, 825.34; 342/42, 43, 44, 45

[56] References Cited

U.S. PATENT DOCUMENTS

| | | | |
|---|---|---|---|
| 3,403,381 | 9/1968 | Haner | 340/825.52 |
| 3,981,011 | 9/1976 | Bell, III . | |
| 4,144,534 | 3/1979 | Prickett et al. | 342/43 |
| 4,495,496 | 1/1985 | Miller, III | 340/825.54 |
| 4,614,945 | 9/1986 | Brunius et al. . | |
| 4,631,708 | 12/1986 | Wood et al. . | |
| 4,680,583 | 7/1987 | Grover | 340/825.52 |
| 4,691,202 | 9/1987 | Denne et al. . | |
| 5,008,861 | 4/1991 | Raj | 340/825.54 |
| 5,124,699 | 6/1992 | Tervoert et al. | 340/825.54 |
| 5,150,114 | 9/1992 | Johansson . | |

FOREIGN PATENT DOCUMENTS

| | | |
|---|---|---|
| 0161779 | 11/1985 | European Pat. Off. . |
| 0285419 | 10/1988 | European Pat. Off. . |
| 0301127 | 2/1989 | European Pat. Off. . |
| 322 701 | 7/1989 | European Pat. Off. . |
| 0405695 | 1/1991 | European Pat. Off. . |
| 467036 | 1/1992 | European Pat. Off. . |
| 2354067 | 5/1975 | Germany . |
| 85/6178 | 8/1985 | South Africa . |
| 2116808 | 9/1983 | United Kingdom . |
| 90/15343 | 12/1990 | WIPO . |

*Primary Examiner*—Edwin C. Holloway III
*Attorney, Agent, or Firm*—Pillsbury Madison & Sutro LLP

[57] ABSTRACT

An identification system includes an interrogator and a number of transponders. The interrogator includes a transmitter for transmitting an interrogation signal to the transponder, and a receiver for receiving a response signal from the transponder. A micro-processor identifies the transponder from data in the response signal. Each transponder includes a receiving antenna for receiving the interrogation signal, a code generator, a transmitting antenna, and a modulator connected to the code generator. On receipt of the interrogation signal the transponder repeatedly transmits a response signal containing data which identifies the transponder. The interrogator detects successful identification of any transponder and briefly interrupts the interrogation signal to indicate the successful identification. Each transponder includes a logic circuit responsive to a respective interruption in the interrogation signal to cease transmission of its own response signal.

55 Claims, 8 Drawing Sheets

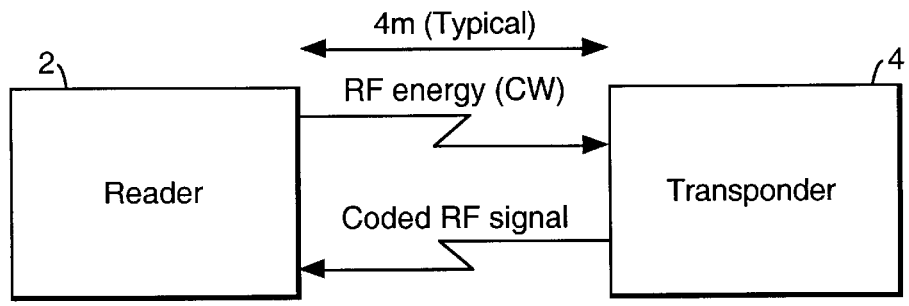
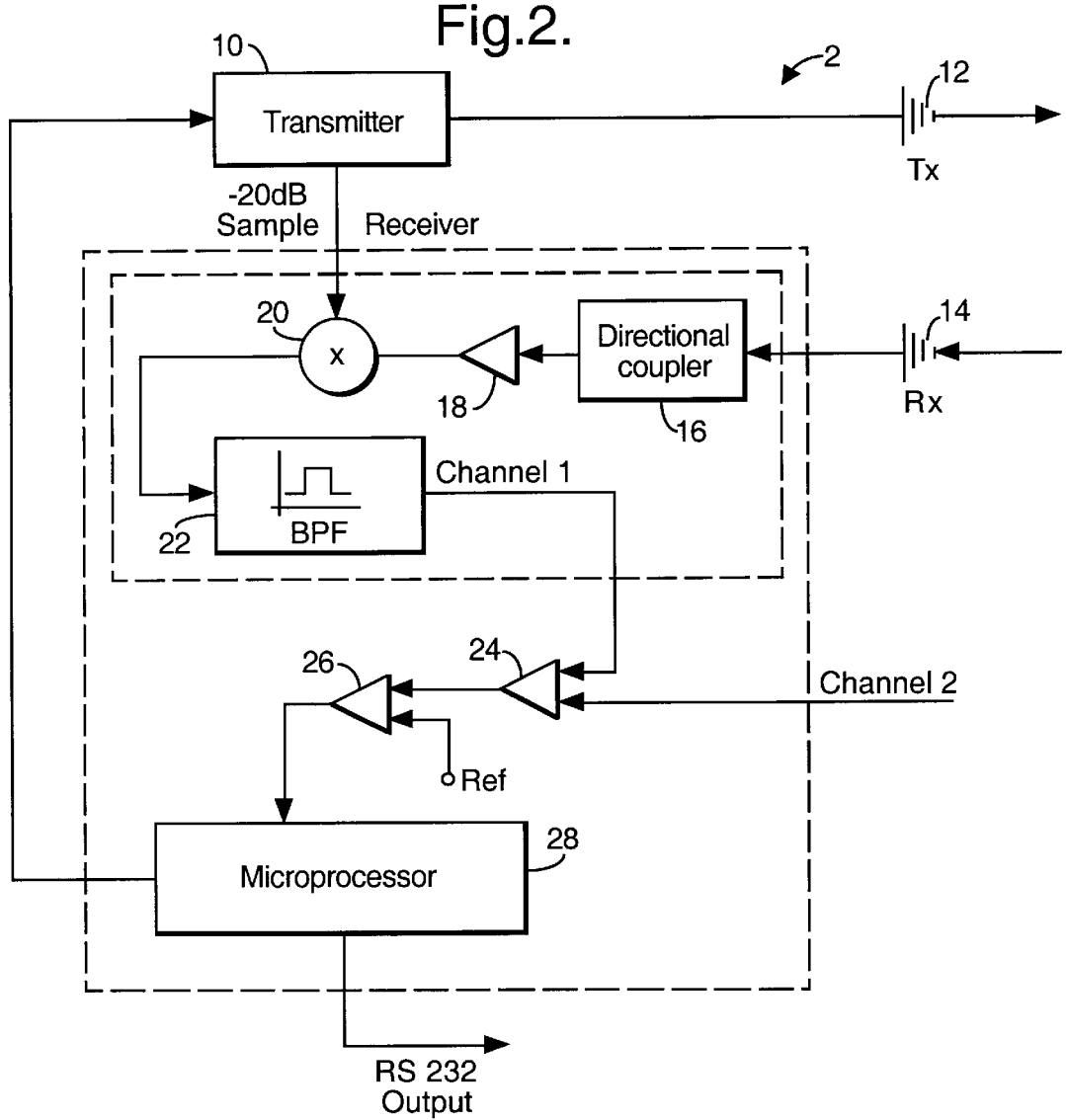

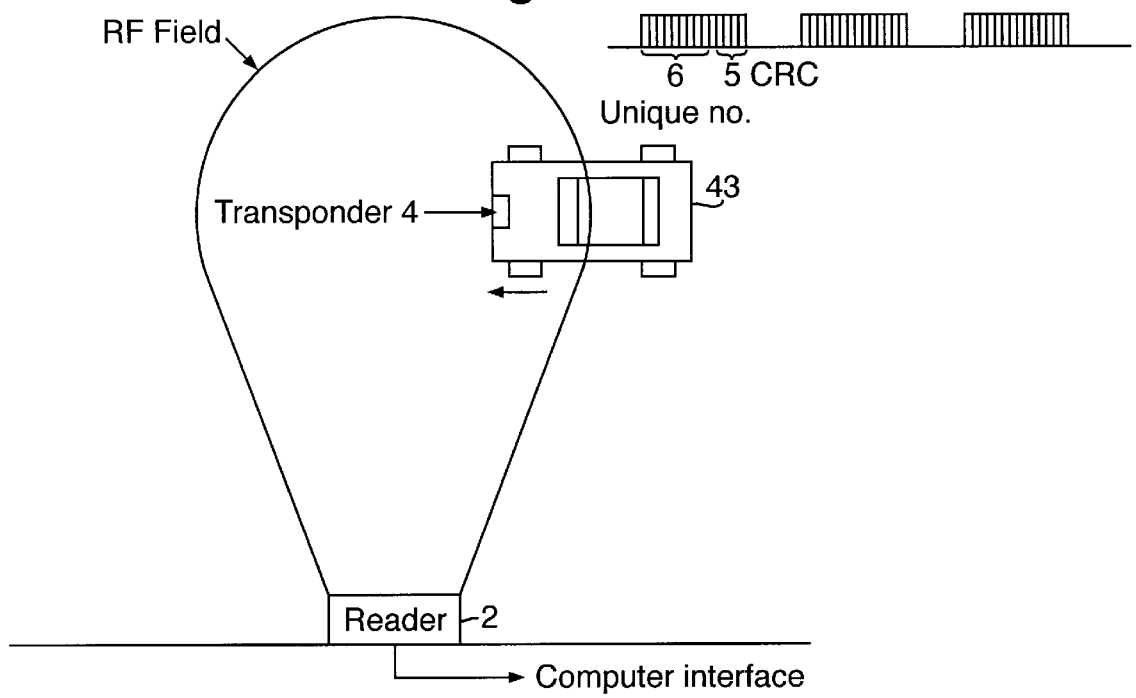
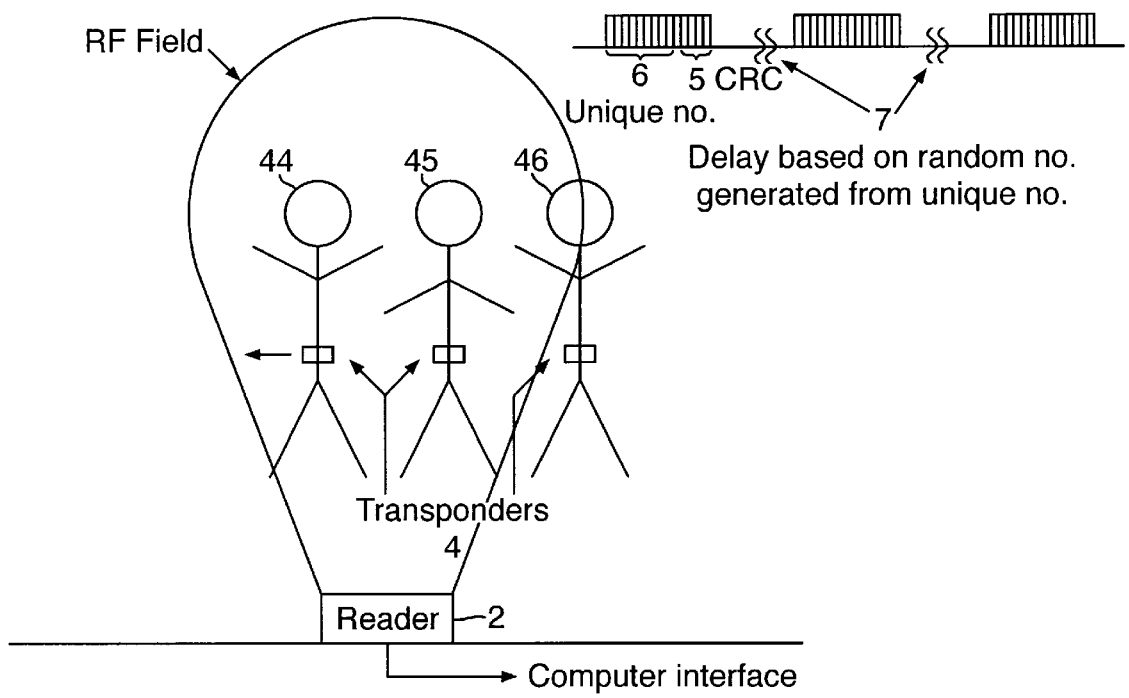

| SB | SA | Max. slots between transmissions |
|---|---|---|
| 0 | 0 | 0 |
| 0 | 1 | 16 |
| 1 | 0 | 128 |
| 1 | 1 | 1024 |

WAVEFORMS WITH GAP DETECTION AND SYNCHRONIZATION

WAVEFORMS WITH NO GAP DETECTION OR SYNCHRONIZATION

ELECTRONIC INDENTIFICATION SYSTEM WITH TRANSPONDER MUTING

This application is a continuation of application Ser. No. 08/581,798, filed on Jan. 2, 1996, now abandoned, which is a continuation of application Ser. No. 07/816,893, filed on Jan. 3, 1992, and issued as U.S. Pat. No. 5,537,105 on Jul. 16, 1996.

BACKGROUND OF THE INVENTION

This invention relates to an identification system comprising an interrogator and a plurality of transponders.

Interrogator/transponder systems have been used for identifying vehicles, animals, people and other objects. Such systems generally comprise an interrogator comprising a transmitter/receiver and a transponder attached to each object to be identified. The transponder carries a code which uniquely identifies the object in question. Systems of this kind can usually only deal effectively with one transponder at a time. Attempts to mass-produce low cost transponders have generally not been successful, due to the requirement for relatively expensive frequency-critical components in the transponder.

It is an object of the invention to provide transponders which can be produced at a relatively low cost, and an identification system employing such transponders.

SUMMARY OF THE INVENTION

According to the invention there is provided an identification system comprising an interrogator and a plurality of transponders, the interrogator including transmitter means for transmitting an interrogation signal to the transponder, receiver means for receiving a response signal from the transponder, and processor means for identifying the transponder from data in the response signal; each transponder comprising a receiving antenna for receiving the interrogation signal, a code generator, a transmitting antenna, and a modulator connected to the code generator, so that on receipt of the interrogation signal the transponder transmits a response signal containing data which identifies the transponder, the transponder being adapted to repeat the transmission of the response signal to increase the probability of successful reception thereof by the interrogator.

Preferably, the interrogator is adapted to detect successful identification of any transponder and to modify the interrogation signal to indicate the successful identification, each transponder including means responsive to a respective modification of the interrogation signal to cease transmission of its response signal.

The interrogator may be adapted to interrupt the interrogation signal for a predetermined period after successfully identifying a particular transponder, that transponder in turn being adapted to sense the interruption in the interrogation signal and to cease transmission of its response signal in response thereto.

The invention extends to a transponder for use with the identification system, the transponder comprising a receiving antenna for receiving the interrogation signal, a code generator, a transmitting antenna, and a modulator connected to the code generator, the transponder being adapted to transmit a response signal containing data which identifies the transponder, the transponder including control means arranged to cause repeated transmission of the response signal to increase the probability of successful reception thereof by the interrogator.

The control means may be responsive to a respective modification of the interrogation signal to cease transmission of the response signal.

Preferably, the control means is arranged to monitor the received interrogation signal and to disable the modulator on receipt of a predetermined confirmation signal from the interrogator which is received after successful reception of the response signal by the interrogator.

In one version of the transponder the modulator is arranged to divert a portion of the energy of the received interrogation signal to the transmitting antenna, so that on receipt of the interrogation signal, the transponder transmits a response signal comprising a carrier derived from the interrogation signal which is modulated by the output of the code generator.

BRIEF DESCRIPTION OF THE DRAWINGS

FIG. 1 is a simplified block diagram showing an interrogator (reader) and a transponder according to the invention;

FIG. 2 is a simplified block diagram of the interrogator of FIG. 1;

FIGS. 8 and 9 are schematic illustrations of two applications of the invention;

DESCRIPTION OF EMBODIMENTS

FIG. 1 illustrates, in a very simplified form, an interrogator (reader) 2 interacting with a transponder 4 according to the invention. FIG. 2 illustrates the basic circuitry of the interrogator in greater detail.

The interrogator 2 includes a transmitter 10 which transmits a 915 MHz interrogation signal at a power of approximately 15 W via a transmitting antenna 12. The transponder 4 receives the interrogation signal and responds with a much weaker response signal at the same frequency, which is modulated with a code identifying the transponder and thus the object with which the transponder is associated. (Operation of the transponder is described below.)

Figure 3:
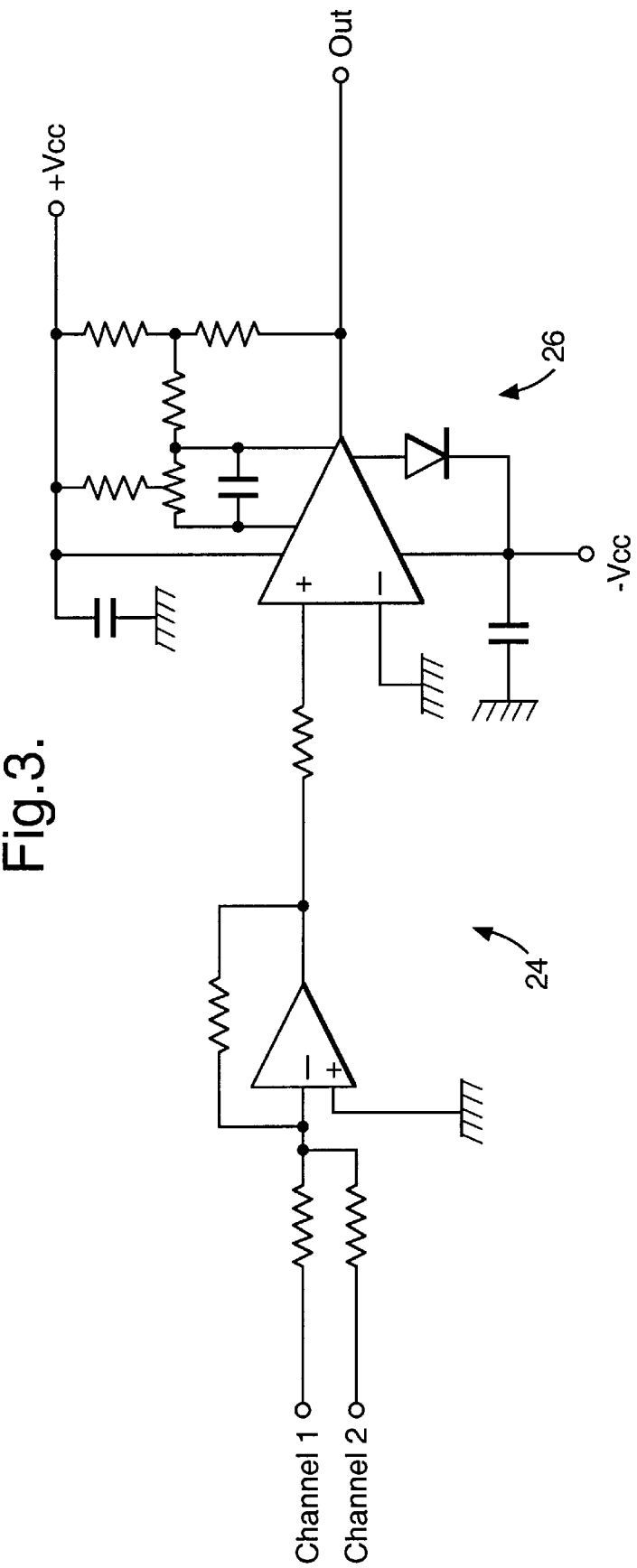
FIG. 3 is a schematic diagram of the amplifier and comparator of the interrogator of FIGS. 1 and 2.

The response signal from the transponder 4 is received by a receiving antenna 14 of the interrogator 2 and passed through a microstrip directional coupler 16, which attenuates excessively strong received signals, to an amplifier 18, before being fed to a mixer 20. The received signal has a carrier frequency which is the same as the transmitting frequency of the interrogator 2. The amplified received signal is mixed with a reference sample from the transmitter 10, and the resulting low frequency output is passed through a bandpass filter 22 and thence to an amplifier 24 and a comparator or threshold detector 26. The comparator squares the amplified output of the bandpass filter, so that its output is a digitally compatible output waveform containing the code transmitted by the transponder. One possible embodiment of a circuit block including the amplifier 24 and the comparator 26 is shown in FIG. 3. This output signal is fed to a microprocessor 28 which analyses the received code and checks its validity using conventional circular redundancy checking systems, before outputting the code for further processing.

It will be noted that the amplifier has a second input for use with a second receiver channel. This input is for use in a version of the transponder 4 with a spatial diversity antenna arrangement, in which two otherwise identical receiving antennas are spaced apart by one half wavelength. This ensures that if one antenna does not receive the interrogation signal adequately strongly, due for example to standing wave effects or the like, the second antenna will receive the interrogation signal. This improves the reliability of operation of the transponder system.

The microprocessor 28 is arranged to control the transmitter 10 to interrupt the output of the transmitter immediately after receipt of a valid identification code from a transponder. For example, immediately after receipt of a valid transmission from any transponder 4, the microprocessor shuts off the transmitter 10 for a brief period, say one millisecond.

Figure 4:
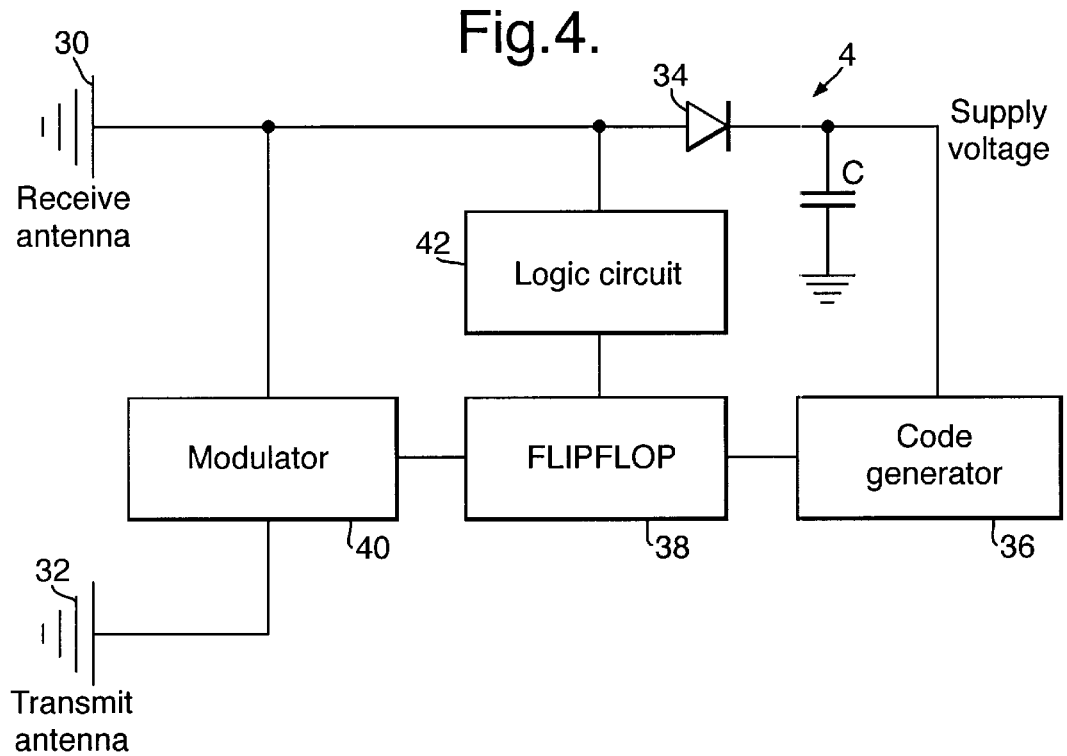
FIG. 4 is a block diagram of a transponder according to the invention.

FIG. 4 illustrates the transponder 4 itself. The transponder 4 includes a receiving antenna 30 and a transmitting antenna 32 which are typically defined by a printed circuit. The antennas 30 and 32 are cross polarised to minimise crosstalk. The receiving antenna is connected via a diode 34 to a charge storage device in the form of a capacitor C, which stores a portion of the energy of the interrogation signal received by the receiving antenna. When the capacitor C has charged sufficiently, it enables an integrated circuit code generator 36, which is pre-programmed with a unique code which is transmitted three times at approximately 1200 baud. The output signal from the code generator is fed via a flipflop 38 to a modulator 40 which re-directs a portion of the energy received via the receiving antenna 30 to the transmitting antenna 32. The flipflop 38 is controlled by a logic circuit 42.

Because the modulator 40 uses the received interrogation signal as the transmitter source for its output carrier signal, no frequency critical components are required, as would be the case with an actively powered transmitter and modulator circuit. Thus, the transponder 4 can comprise a circuit board on which the receiving and transmitting antennas 30 and 32 are printed, together with one or more integrated circuits providing charge storage, code generation and modulating functions. It is also possible to combine the transmitting and receiving antennas in a single antenna. The modulator 40 is typically a diode which is reverse biased and which is biased into a conducting mode by pulses from the code generator to allow energy transfer from the receiving antenna 30 to the transmitting antenna 32.

Obviously, the receiving antenna 14 of the interrogator receives a strong component of the interrogation signal transmitted by its transmitting antenna 12. However, in view of the fact that mixing of two identical frequency components gives a DC component in the mixer, it is a relatively simple matter to remove this component by means of the bandpass filter 22, so that the received code is not contaminated. Thus, simultaneous transmission and reception on the same frequency is possible, as well as the use of a highly simplified transponder circuit.

In an alternative version of the transponder 4, the transponder 4 is provided with its own power supply, such as a battery, and can therefore use an input amplifier to improve its sensitivity. This allows the interrogator 2 to transmit at a significantly lower power, for example, at 100 mW instead of 15 W. This is because the interrogation signal does not need to contain sufficient energy to power the transponder in this application. A transmitting power of 100 mW has been found to be adequate for a reading distance of 4 m. However, the embodiment illustrated in FIG. 4 is particularly advantageous, due to its compatibility with ultra low cost mass production techniques, which facilitates multiple article identification as described below.

When the interrogator 2 receives response signals from several transponders 4 which have been interrogated at the same time, it will occur from time to time that two or more transponders 4 are transmitting during the same period, notwithstanding the fact that there is a random or pseudo-random delay between transmissions from each transponder 4, so that the transponders 4 effectively "jam" each other. This will generally prevent correct reception of the code transmitted by either transponder. However, provided that the codes transmitted by the transponders are fixed in length and include error correction bits, such as CRC codes 5 (see FIGS. 8 and 9), it is possible for the interrogator 2 to confirm whether or not it has received a valid code. As mentioned above, as soon as a code is validly received, the interrogation signal is interrupted briefly, for a period shorter than the length of a transponder transmission.

The logic circuit 42 in each transponder 4 monitors the presence of the interrogation signal at the output of the receiving antenna 30. As soon as the logic circuit detects the interruption in the interrogation signal following on the completion of the last transmission by the transponder 4, the flipflop 38 is set, disabling the modulator 40 and thus stopping the transmission from that transponder.

Figure 5:
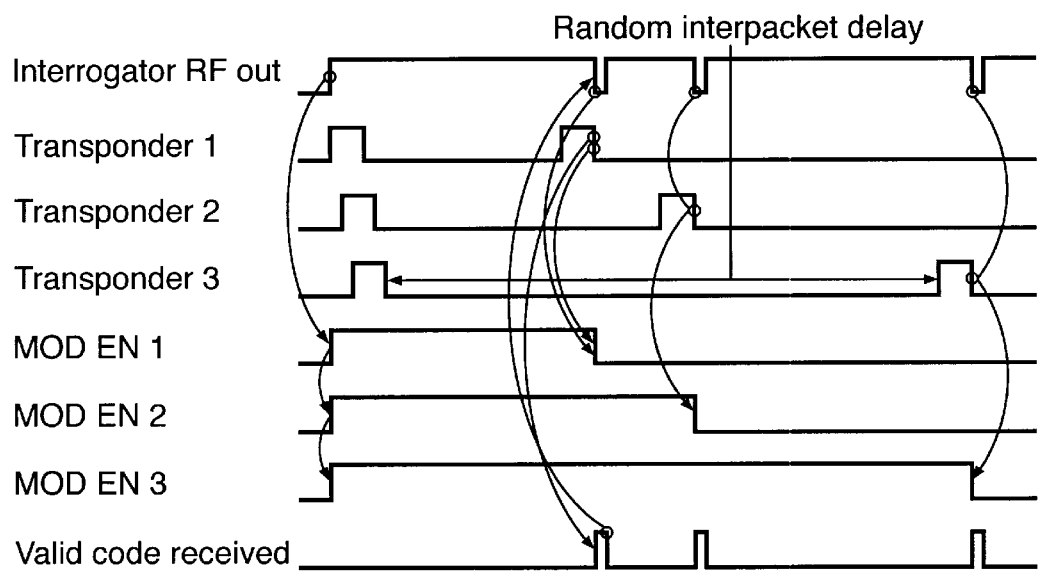
FIG. 5 is a timing diagram illustrating the operation of the interrogator and three transponders.
Figure 6:
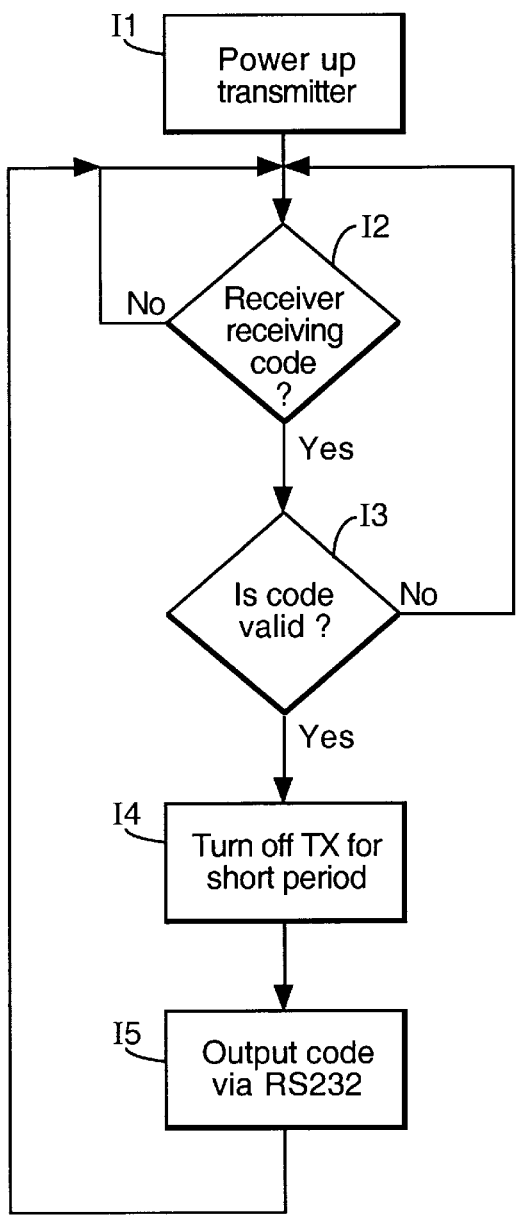
FIG. 6 is a simplified flow chart illustrating the operation of the interrogator.
Figure 7:
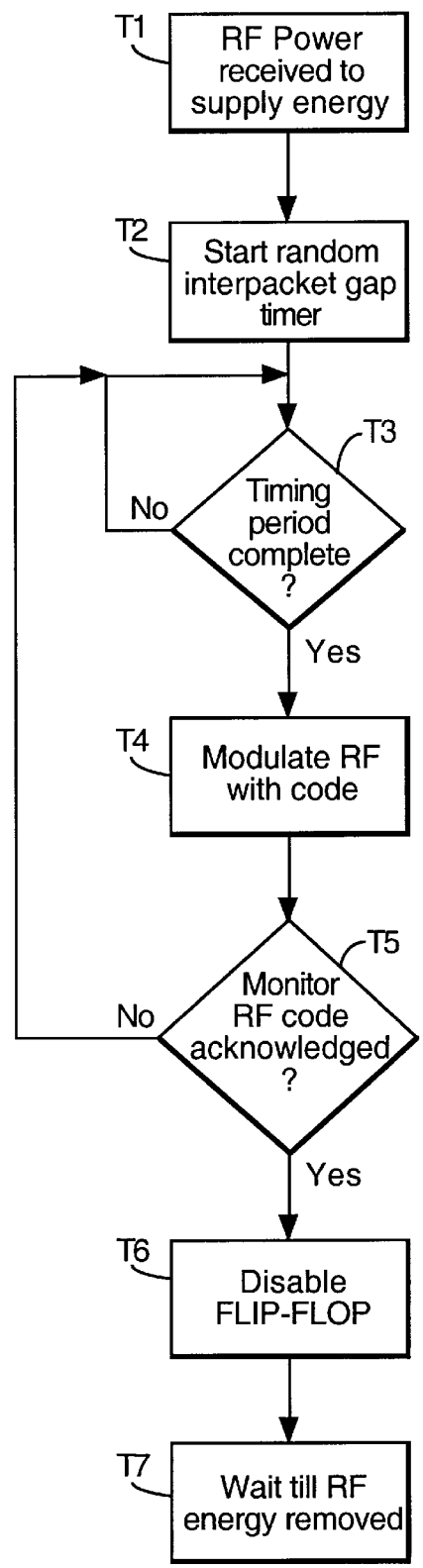
FIG. 7 is a simplified flow chart illustrating the operation of each transponder.

The timing diagram of FIG. 5 illustrates the interaction of the interrogator 2 and three transponders 4, while the flow charts of FIGS. 6 and 7 illustrate the sequence of operation of the interrogator (I1–I5) and the transponders (T1–T7), respectively.

The effect of the above arrangement is that each transponder 4 ceases to transmit as soon as it has successfully transmitted its identification code to the interrogator 2. As each transponder shuts down, more interference-free time is created within which other transponders in a group of such transponders can transmit their signals to the interrogator. This process continues until all of the transponders have successfully transmitted their identification code to the interrogator. The microprocessor can count the number of transponders identified.

Assuming that all transponders 4 have the same identification code, it is thus possible for the interrogator 2 to count the number of transponders 4 which respond to the interrogation signal in a particular time period. For example, a large number of identical articles can each be provided with a transponder, all the transponders having the same identification code, and a portable interrogator unit can be used to count the articles. This can be done, for example, in a warehouse or other storage area, and obviates the necessity for physically counting stock. The transponders 4 can be fitted to individual articles, or to containers such as boxes, each of which contains a known number of articles. It will be appreciated that it is not even necessary for the articles which are fitted with transponders 4 to be visible for them to be counted in this way. Conveniently, the antennas 30 and 32 (or a single dual-purpose antenna) can be printed on a surface of the container using conductive ink, while the electronic circuitry of the transponder is secured to the surface in electrical contact with the antenna(s). Such an embodiment can be produced very inexpensively using the passive transponder 4 embodiment described above, making it possible to use the transponders in an automatic stock control system for relatively low cost articles.

Because of the low cost of the passive transponders 4, it is proposed, eventually, that a transponder can be attached to each item of stock in a supermarket, for example, so that a trolley full of groceries can be scanned automatically by an interrogator 2 located at a till, without any handling of the goods by a cashier being required. This is possible because the invention makes it possible both to identify each item in a group of different items, as well as to count the number of each type of item present. Obviously, the cost of the transponders 4 would determine the value of the articles to which they can viably be applied. However, with present day technology, the transponders 4 can be produced at a cost low enough for them to be used economically with medium-priced articles such as domestic appliances, applied to disposable packaging.

In a further development of the invention, the interrogation signal can be modulated intermittently with a code signal corresponding to the identity of one or more transponders 4, or a designated class of transponders 4, which are being sought. The logic circuit 42 of each transponder 4 then checks the transmitted code in the interrogation signal, and activates the transponder only if it is one of those transponders corresponding to the transmitted code. Other transponders remain disabled. Once all transponders in a particular category have been identified and/or counted, the interrogation signal is removed to allow the charge storage device in the transponders to discharge, and the code in the interrogation signal is then changed to allow a new category of transponders to be interrogated.

Two further applications of the transponder are schematically illustrated in FIGS. 8 and 9. The application illustrated in FIG. 8 is for vehicle identification, where one vehicle 43 or several vehicles can be identified at a time. In the application illustrated schematically in FIG. 9, the system is used to identify the members of a group of people 44, 45, 46, who may pass the interrogator simultaneously. In conventional systems, simultaneous interrogation of a number of transponders would result in simultaneous transmission from the transponders 4, making it impossible to read the transmitted data. However, the code generator 36 of each transponder 4 transmits its unique code 6 three times, with a spacing between transmissions which is pseudo-randomly determined based on the identification code of that transponder itself. This assists in allowing each transponder to have a "quiet time" when it is the only unit radiating.

Another application for the transponders is in identifying personnel, as shown in FIG. 9. Tests have been conducted in which transponders according to the invention were fitted to the battery boxes of miner's cap lamps. In this case, powered versions of the transponders were used, due to the ready availability of battery power. Interrogators are placed at desired locations, for example at the entrances to mine haulages or stops, and can count personnel entering demarcated areas, as well as identifying each person individually. The individual interrogators are connected to a central computer, which can monitor the movement of personnel in the mine, and which can generate a map or other display, if required, indicating the location of each individual. This is particularly useful in emergencies, allowing rescue parties to know how many individuals are trapped in a certain area after a rock fail, for example.

A prototype system, employing a 915 MHz interrogation signal of 15 W, can effectively read transponders in the form of badges the size of a credit card at a distance of approximately 4 m. 64 bit identification codes were used in the prototype, allowing a large number of uniquely identified transponders to be provided.

A prototype of the transponder was developed using two custom made integrated circuits IC1 (50) and IC2 (52). The first integrated circuit, IC1, is designated type CLA 61061 and is a CMOS Manchester encoder with a pseudo random delay function. This device is designed for the serial transmission of either a 64 bit or a 128 bit word in Manchester II format, at pseudo random intervals. The chip also provides addressing for a memory device in which the word to be transmitted (that is, the identification code) is stored, and logic control of the timing sequence of operation.

The integrated circuit IC2 (52) is designated type */047 and comprises a bipolar analogue PROM, an oscillator, and a power-on-reset circuit on a single chip. The chip also includes a "gap detector" circuit and circuitry for rectifying and modulating an RF carrier. The RF circuitry can be bypassed in part or completely, to make use of special high frequency rectifying diodes. The PROM is a 64 bit memory implemented with aluminium fuses which are selectively blown before packaging of the chip, to store a selected identification code.

Figures 10, 14:
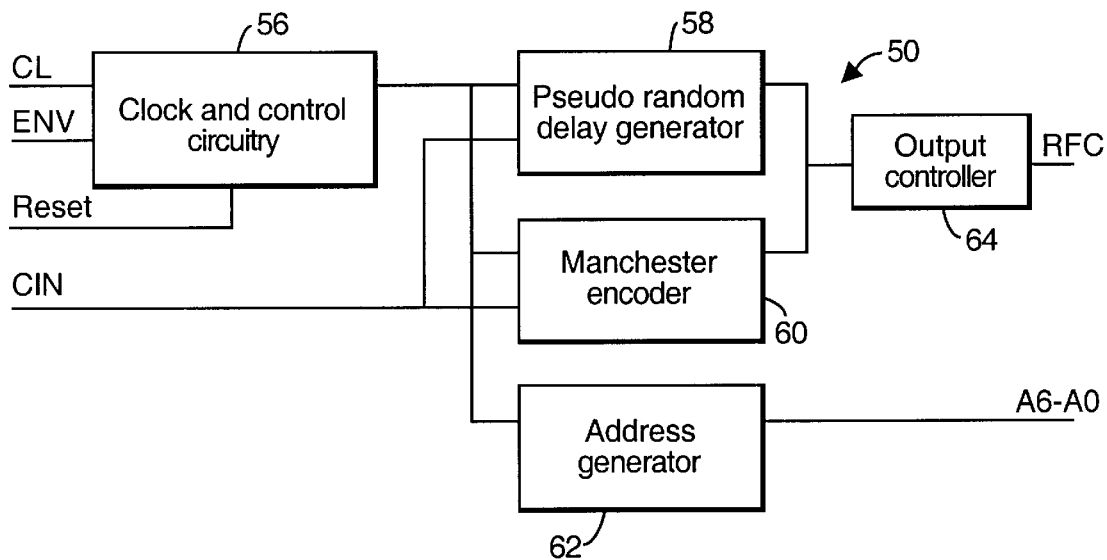
FIG. 10 is a functional block diagram of an integrated circuit employed in the transponder.
FIG. 14 is a table showing the response of the integrated circuit of FIG. 10 to different control signals.
Figure 11:
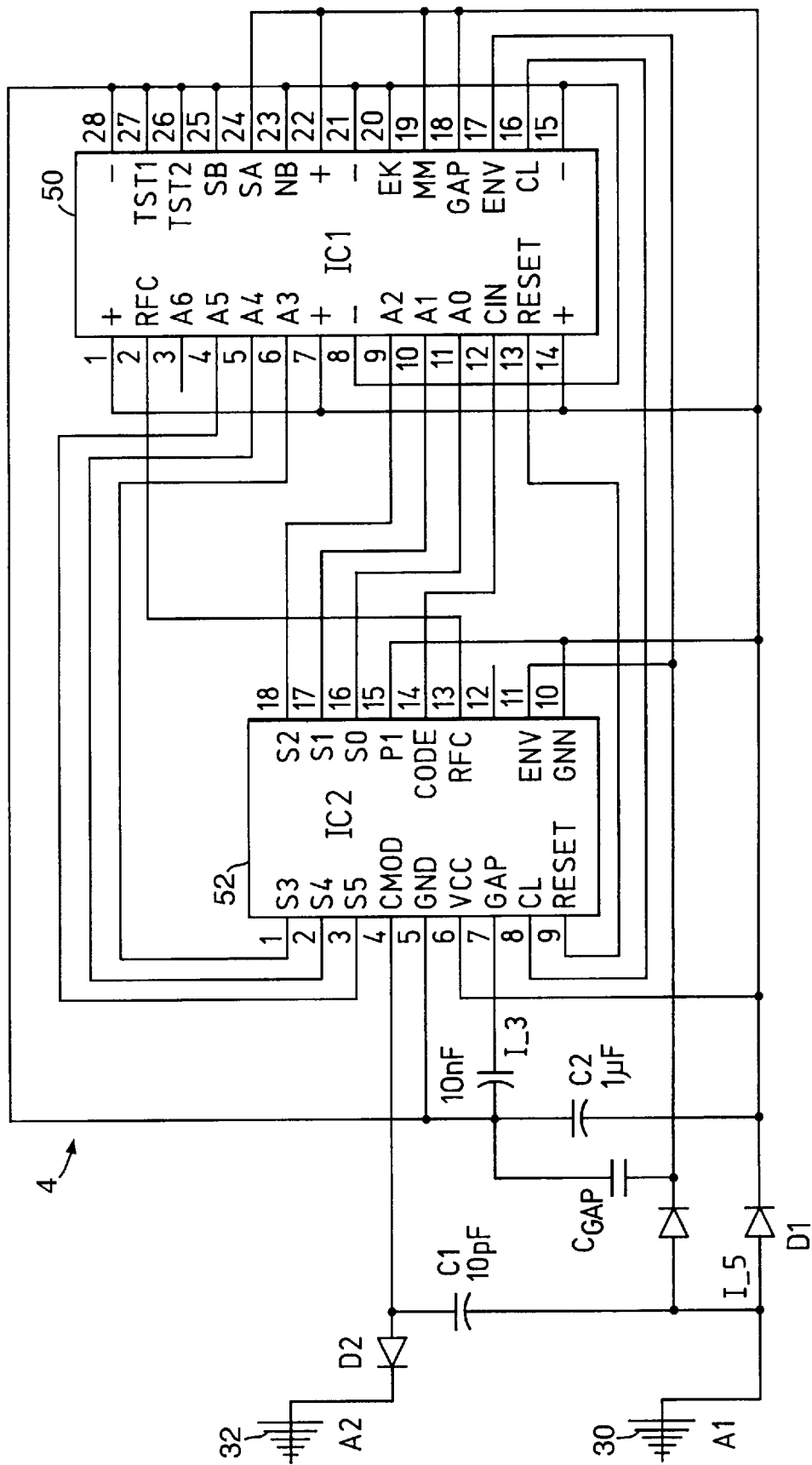
FIG. 11 is a circuit diagram of an embodiment of the transponder.

FIG. 10 is a functional block diagram of the integrated circuit IC1 (50) which comprises clock and control circuitry 56, pseudo random delay generator 58, Manchester encoder 60, address generator 62 and output controller 64, FIG. 11 illustrates one possible implementation of a transponder using the two integrated circuits. In FIG. 11, a capacitor $C_{gap}$ (54) is provided for systems in which the transponder waits for a "gap" or quiet period before responding to an interrogation signal.

Figure 12:
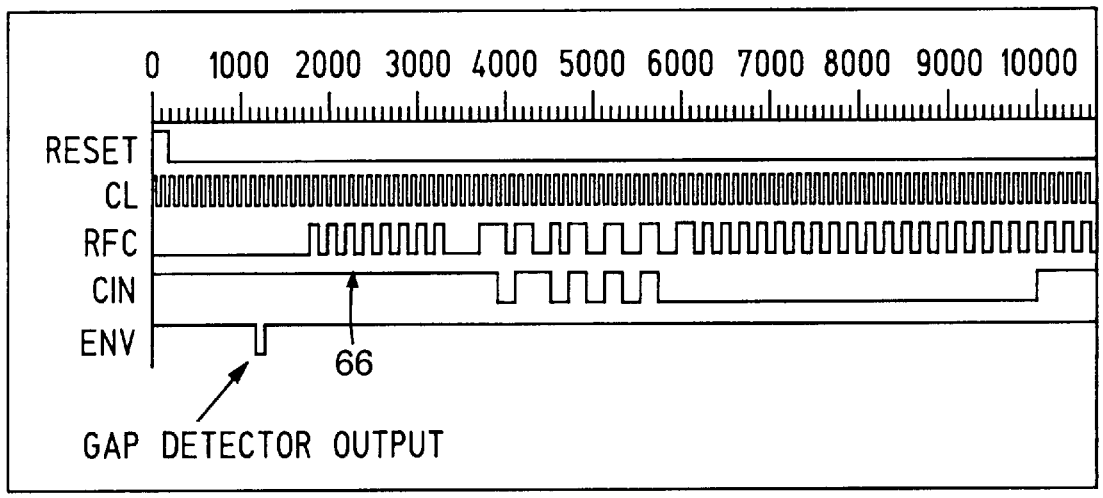
FIGS. 12 and 13 are typical waveforms generated by the transponder and interrogator.
Figure 13:
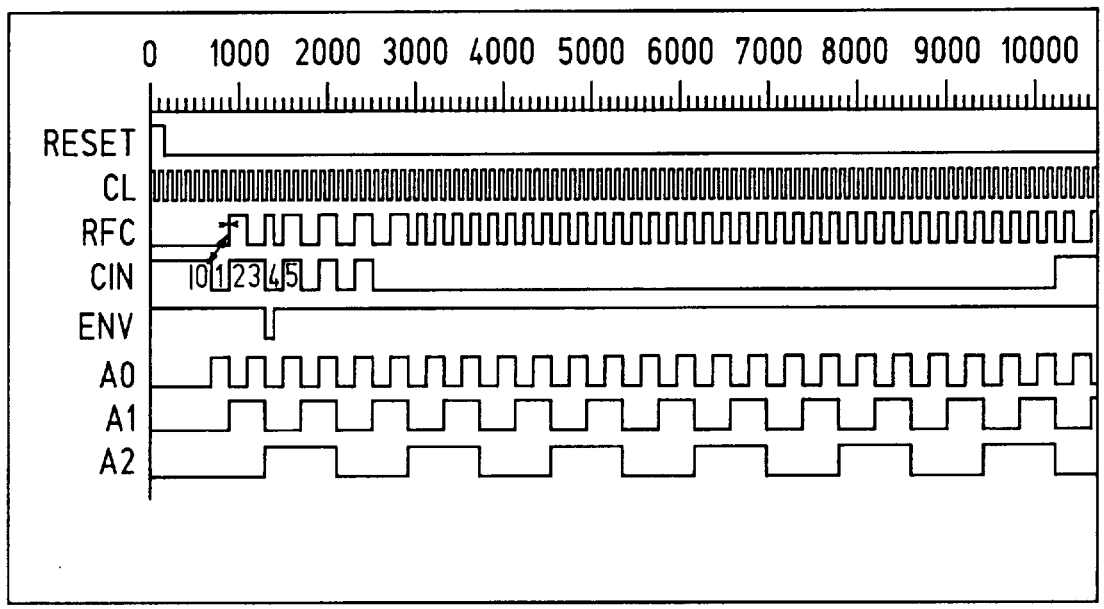

In FIG. 12, the RFC pulse train includes a set of synchronisation pulses 66, which can be omitted in applications where it is necessary to save time, or where the coding of the received signal is performed in software (see FIG. 13).

On start-up of the integrated circuit IC1, the memory device (IC2) is addressed and the Manchester data sequence is transmitted. The internal pseudo random number generator of the chip IC2 is loaded with the last 16 bits of the data in the memory device, which determine a pseudo random time interval before the Manchester sequence is transmitted again. The maximum length of the interval is a multiple of the length of the time taken to transmit one Manchester sequence. The integrated circuit IC1 has a number of control pins which allow its operation to be modified as required. The pins SA and SB (see FIG. 11) control the time interval between data transmission, in accordance with the table of FIG. 14. In FIG. 14, each "slot" referred to in the third column of the table is equal to the length of a single Manchester sequence transmission.

Start-up of the integrated circuit IC1 can be initiated in one of two ways, determined by the status of the pin GAP. In the first mode, operation starts as soon as the RESET pin goes low, while in the second mode, operation starts after the RESET pin goes low and a rising edge is presented to the ENV pin. This is used to delay transmission from the transponder until a low-going pulse has been presented to the ENV pin by the logic circuit 42, which provides the "gap detection" or "quiet period" detection function referred to above.

The status of the pin MM determines the appearance of the Manchester sequence. If the pin MM is high, the data in the memory device is transmitted as a simple sequence of Manchester bits with no synchronisation pulses. With the pin MM low, the Manchester sequence starts with eight Manchester 0's for synchronisation and a command synchronisation sequence before transmitting the data bytes. The pin EK, when high, enables the termination of transmission after three transmissions of the Manchester sequence. If the pin EK is held low, transmission continues until the integrated circuit is powered down or reset. The status of the pin NB determines the length of the sequence that is transmitted. If the pin NB is held low, addressing for 64 bits is provided and 64 bits are transmitted. With the pin NB held high, 128 bits are addressed and transmitted. Both integrated circuits are designed to operate at low voltages of 2 V or less, and to draw low currents of less than 1 mA.

We claim:

1. An identification system comprising an interrogator and a set of transponders, the interrogator comprising:
    a transmitter arranged to transmit an interrogation signal to the transponders;
    a receiver arranged to receive transponder response signals from the transponders;
    means for identifying a transponder from data in a corresponding one of the transponder response signals; and
    means for indicating a successful identification of the transponder response signal to the identified transponder a predetermined period after the transponder response signal from the identified transponder is received; each of the transponders comprising:
        a receiver arranged to receive the interrogation signal,
        means for repeatedly transmitting the transponder response signals including data which identifies the transponder,
        means for muting the transponder in response to receiving the successful identification indication from the interrogator; and
        means for inserting a random or pseudo-random interval between the transponder response signals, wherein
        the set of transponders contains two or more transponders having a same transponder identity and transmitting the transponder response signals including a same data in response to the interrogation signal.

2. An identification system according to claim 1, wherein a length of the random or pseudo-random intervals is derived from data identifying each of the transponders.

3. An identification system according to claim 1, wherein the interrogator is adapted to transmit a code identifying a predetermined transponder or category of transponders, each of the transponders including circuitry for enabling the transponder only on receipt of the code corresponding thereto.

4. An identification system according to claim 1, wherein each of the transponders comprises a modulator, arranged to divert a portion of energy of the received interrogation signal to a transmitting antenna.

5. An identification system according to claim 1, wherein the interrogator further comprises:
    a mixer for mixing a reference signal derived from the interrogation signal with the received corresponding one of the transponder response signals from one of the transponders; and
    filter means for extracting a difference signal from a mixer output which contains the data from the corresponding one of the transponder response signals.

6. An identification system according to claim 1, wherein the means for indicating the successful identification of the transponder is arranged to indicate the successful identification by modifying the interrogation signal.

7. An identification system according to claim 6, wherein the means for muting the transponder is responsive to a respective modification of the interrogation signal to cease transmission of the corresponding one of the transponder response signals.

8. An identification system according to claim 6, wherein the means for indicating the successful identification of the transponder is arranged to modify the interrogation signal for a predetermined interval.

9. An identification system according to claim 6, wherein a particular transponder senses a respective modification in the interrogation signal.

10. An identification system according to claim 6, wherein a particular transponder ceases transmission of a corresponding one of the transponder response signals in response to a respective modification of the interrogation signal.

11. An identification system according to claim 10, wherein a predetermined interval for which the interrogation signal is modified is shorter than the corresponding one of the transponder response signals of each of the transponders.

12. An identification system according to claim 11, wherein on receipt of the interrogation signal, a corresponding transponder is arranged to transmit a corresponding transponder response signal comprising a carrier derived from the interrogation signal modulated by the data identifying the corresponding transponder.

13. An identification system according to claim 12, wherein the data in the corresponding transponder response signal is generated by a code generator connected to a modulator.

14. A transponder comprising
    means for receiving an interrogation signal;
    means for repeatedly transmitting transponder response signals including data which identifies the transponder;
    means for inserting a random or pseudo-random interval between transponder response signals; and
    control means for muting the transponder in response to an indication of successful identification occurring a predetermined period after a corresponding one of the transponder response signals is transmitted, wherein
    in a set of transponders, two or more transponders having a same transponder identity are arranged to transmit the transponder response signals including a same data in response to the interrogation signal.

15. A transponder according to claim 14 further comprising a receiving antenna formed on a substrate.

16. A transponder according to claim 14 further comprising a transmitting antenna formed on a substrate.

17. A transponder according to claims 15 or 16, wherein the antenna is formed by printing on the substrate with a conductive material.

18. A transponder according to claim 14, further comprising a modulator, arranged to divert a portion of energy of the received interrogation signal to a transmitting antenna.

19. A transponder according to claim 18, wherein on receipt of the interrogation signal, the transponder transmits the transponder response signals comprising a carrier derived from the interrogation signal which is modulated by the data identifying the transponder.

20. A transponder according to claim 19 further comprising a code generator, wherein the data in the transponder response signals is generated by the code generator connected to the modulator.

21. A transponder according to claim 20 further comprising charge storage means for storing a portion of energy of the interrogation signal, the code generator being arranged to be powered by the charge storage means in operation.

22. A transponder according to claim 14, wherein the indication to which the control means is responsive is a respective modification of the interrogation signal.

23. A transponder according to claim 22, wherein the control means is further for monitoring the received interrogation signal and for disabling a modulator on receipt of a predetermined confirmation signal from the interrogator.

24. A transponder according to claim 22, wherein the control means is adapted to detect a modification of the interrogation signal of a predetermined interval.

25. A transponder according to claim 22 wherein the control means is further for monitoring the received interrogation signal for a predetermined code, and for enabling a modulator only on receipt of the predetermined code.

26. A transponder according to claim 22, wherein a length of the random or pseudo-random intervals is derived from the data identifying the transponder.

27. A transponder according to claim 22, wherein the control means is further for monitoring the received interrogation signal and for enabling transmission of the transponder response signals only after a modification of the interrogation signal for a predetermined duration.

28. An interrogator for identifying a set of transponders, the interrogator comprising:
a transmitter arranged to transmit an interrogation signal to the set of transponders;
a receiver arranged to receive transponder response signals from the transponders;
means for identifying the transponder response signals and for determining a number of transponders; and
means for indicating a successful identification to the identified transponder a predetermined period after a corresponding one of the transponder response signals from the identified transponder is received, wherein
the identified transponder is arranged to be muted in response to the successful identification, and
the set of transponders include at least two transponders having a same transponder identity and transmitting the transponder response signals having a same data in response to the interrogation signal.

29. An interrogator according to claim 28, wherein the interrogator is adapted to transmit a code identifying a predetermined transponder or category of transponders, each of the transponders including circuitry for enabling the transponder only on receipt of the code corresponding thereto.

30. An interrogator according to claim 28 further comprising:
a mixer for mixing a reference signal derived from the interrogation signal with one of the received transponder response signals; and
filter means for extracting a difference signal from a mixer output which contains data from the one of the transponder response signals.

31. An interrogator according to claim 28, wherein the means for indicating the successful identification modifies the interrogation signal to indicate the successful identification.

32. An interrogator according to claim 31, wherein the means for indicating the successful identification is arranged to modify the interrogation signal for a predetermined interval after successfully identifying a particular transponder.

33. An integrated circuit for use in a transponder, the integrated circuit comprising:
means for repeatedly generating second signals including data which identifies the integrated circuit in response to a first signal;
means for inserting one of a random and pseudo-random interval between the second signals;
means, responsive to an indication of successful identification from an interrogator, for disabling the means for repeatedly generating second signals, wherein:
in a set of integrated circuits, allowing at least two of the integrated circuits to generate the second signals including identical data indicating identical identities for respective ones of the at least two integrated circuits in response to an interrogation signal.

34. An integrated circuit according to claim 33, further comprising a modulator, arranged to divert a portion of energy of the first signal.

35. An integrated circuit according to claim 33 characterised in that on receipt of the first signal, the integrated circuit generates the second signals comprising a carrier derived from the first signal which is modulated by the data identifying the integrated circuit.

36. An integrated circuit according to claim 35, wherein the data in the second signals are generated by a code generator connected to a modulator, the code generator and the modulator being included in the integrated circuit.

37. An integrated circuit according to claim 36 further comprising charge storage means for storing a portion of energy of the first signal, the code generator being arranged to be powered by the charge storage means in operation.

38. An integrated circuit according to claim 33, wherein the indication of successful identification is a respective modification of the first signal.

39. An integrated circuit according to claim 38, wherein the disabling means is adapted to detect a modification of the first signal of a predetermined period.

40. An integrated circuit according to claim 38, wherein the disabling means is arranged to monitor the first signal and to disable a modulator on receipt of a predetermined confirmation signal.

41. An integrated circuit according to claim 38, wherein the disabling means is adapted to monitor the first signal for a predetermined code, and to enable a modulator only on receipt of that code.

42. An integrated circuit according to claim 38, wherein the control means is adapted to monitor the received first signal and to enable generation of the second signals only after a modification of the first signal for a predetermined duration.

43. An integrated circuit according to claim 30 characterised in that the disabling means is adapted to cause repeated generation of the second signals at one of the random and the pseudo-random intervals.

44. An integrated circuit according to claim 43, wherein a length of the random or pseudo-random intervals is derived from the data identifying the integrated circuit.

45. A transponder comprising:
an integrated circuit; and
a receiving antenna formed on a substrate, the integrated circuit comprising:

means for repeatedly generating second signals including data which identifies the integrated circuit in response to a first signal;

means for inserting one of a random and pseudo-random interval between the second signals;

means, responsive to an indication of successful identification from an interrogator, for disabling the means for repeatedly generating second signals, wherein:

in a set of transponders having integrated circuits, allowing at least two of the transponders to generate the second signals including identical data indicating identical identities for respective ones of the at least two transponders in response to an interrogation signal.

46. A transponder comprising:

an integrated circuit; and a transmitting antenna formed on a substrate, the integrated circuit comprising:

means for repeatedly generating second signals including data which identifies the integrated circuit in response to a first signal;

means for inserting one of a random and pseudo-random interval between the second signals;

means, responsive to an indication of successful identification from an interrogator, for disabling the means for repeatedly generating second signals, wherein:

in a set of transponders having integrated circuits, allowing at least two of the transponders to generate the second signals including identical data indicating identical identities for respective ones of the at least two transponders in response to an interrogation signal.

47. A transponder according to claim 45 or 46, wherein the antenna is formed by printing on the substrate with a conductive material.

48. A method for identifying a transponder in an identification system, the method comprising:

transmitting an interrogation signal to a plurality of transponders from an interrogator;

transmitting a transponder response signal from a transponder in response to the interrogation signal, the transponder response signal including data which identifies the transponder;

receiving the transponder response signal at the interrogator;

identifying the transponder from the data in the transponder response signal;

indicating a successful identification of the transponder response signal to the identified transponder a predetermined period after the transponder response signal from the identified transponder is received at the interrogator; and muting the transponder in response to receiving the successful identification indication from the interrogator, wherein at least two transponders of the plurality of transponders have a same transponder identity and transmit transponder response signals including the same transponder identity in response to the interrogator signal, and when the transponder fails to sense a successful indication of the transponder response signal, retransmitting the transponder response signal a random or pseudo-random interval of time after a previous transmission of the transponder response signal.

49. A method according to claim 48, wherein a length of the random or the pseudo-random intervals is derived from the data identifying the transponder.

50. A method according to claim 48, wherein the interrogation signal includes a code identifying a category of transponders and the transponder being enabled upon receiving the code corresponding thereto.

51. A method according to claim 48, wherein the indicating the successful identification of the transponder response signal comprises modifying the interrogation signal.

52. A method according to claim 51, further comprising sensing, by a particular transponder, of a respective modification in the interrogation signal.

53. A method according to claim 51, wherein the indicating the successful identification of the transponder response signal comprises modifying the interrogation signal for a predetermined interval.

54. A method according to claim 53, wherein the predetermined interval is shorter than an interval for sending the transponder response signal.

55. A method according to claim 54, wherein the transponder response signal comprises a carrier wave derived from the interrogation signal modulated by the data identifying the transponder.

* * * * *